Jan. 7, 1941.  A. H. CHURCH  2,227,440
METHOD OF MAKING NOZZLE CLOSURE MEANS FOR CONTAINERS
Original Filed Nov. 6, 1934   5 Sheets-Sheet 1

Jan. 7, 1941.  A. H. CHURCH  2,227,440
METHOD OF MAKING NOZZLE CLOSURE MEANS FOR CONTAINERS
Original Filed Nov. 6, 1934   5 Sheets-Sheet 3

Inventor,
Albert H. Church, Deceased,
By Kenneth Crowell Baxter,
Administrator.

By

Thomas A. Jenckes
Attorney

Jan. 7, 1941.  A. H. CHURCH  2,227,440
METHOD OF MAKING NOZZLE CLOSURE MEANS FOR CONTAINERS
Original Filed Nov. 6, 1934   5 Sheets-Sheet 5

Inventor,
Albert H. Church, Deceased,
By Kenneth Crowell Baxter, Administrator.

By Thomas A. Jenckes
Attorney

Patented Jan. 7, 1941

2,227,440

UNITED STATES PATENT OFFICE 2,227,440

METHOD OF MAKING NOZZLE CLOSURE MEANS FOR CONTAINERS

Albert H. Church, deceased, late of Providence, R. I., by Kenneth Crowell Baxter, administrator, Providence, R. I.; said Albert H. Church assignor to No-Kap Closures (U. S. A.), Inc., Providence, R. I., a corporation of Rhode Island Original application November 6, 1934, Serial No. 751,734, now Patent No. 2,127,465, dated August 16 1938. Divided and this application August 15, 1938, Serial No. 224,947

10 Claims. (Cl. 29—148.2)

This invention relates to improvements in nozzle closure means for containers, cans, tubes, bottles or the like. This is a divisional application of application Ser. No. 751,734, filed November 6, 1934 now Patent #2,127,465, issued August 16, 1938, for Nozzle closure means for containers, bottles, tubes, cans, and the like, and the method of its manufacture which contains the following description: While my invention is particularly adapted for use with collapsible tubes in which at least a portion of the valve seat for the oscillatable, substantially spherical valve closure member thereof may be extruded simultaneously with the extrusion of the tube, it is equally applicable as a bottle nozzle closure means, provided, if desired, with a depending flange similar to the upper end forming flange of a collapsible tube and also, if desired, with a nozzle extension projecting downwardly therefrom adapted to fit within a cork to secure it to the top of the bottle, or with the nozzle itself being provided with an extension going around the neck of the bottle. It is apparent when it is applied to cans and containers, either the whole can or container or the top of the container only may be extruded or formed simultaneously with the formation of the nozzle and valve seat. The invention is adapted to dispense materials in powder form and more particularly is adapted to dispense materials in plastic, semi-plastic partially liquefied form or liquid form and to provide at all times a positive closure for the nozzle means thereof which will not leak and has been proven in tests not to leak with water, glycerine or other types of chemicals over a long period of time.

While I am aware that others have provided nozzle closure means for containers, bottles, cans, tubes and the like having at least a partially spherical closure member functioning as a valve and rotatably mounted in a suitably formed valve seat in the nozzle thereof, so far as I am aware these have been largely paper patents either impossible to manufacture or only made at a great expense. I believe that I am the first therefore to provide a nozzle closure means of this type which may be manufactured on a practical commercial basis in the manner described herein and which is positively liquid, chemical and air resistant, and in which the valve forms preferably with a countersunk washer a liquid chemical and air resistant positive joint when in closed position and which may be readily manufactured in the simple manner shown herein and at a cost to make this type of a valve closure means possible under competitive conditions with other types of closure means now on the market.

As stated, hitherto the great difficulty with devices of this description has been that the valve action is not air or liquid resistant. An object of my invention therefore is to provide a nozzle closure means of this general description in which the valve action is air, liquid and chemical resistant, and to this end I broadly provide, in combination, a valve seat constructed of thin more or less slightly yieldable metal preferably in such a manner that it of itself may be slightly yieldable and construct the valve itself preferably of a predetermined chemical resistant preferably slightly yieldable composition material which functions in combination with the metal of the valve seat to form a substantially yieldable air and liquid tight joint at all times.

As a further precaution to insure an air tight, liquid tight joint I preferably provide in the valve seat a countersunk preferably resilient fibre or other type of washer to positively bear against the oscillatable valve at all times to insure a tight joint, said washer being preferably countersunk within the valve seat to keep it in accurate alignment therein at all times.

Great difficulty has been hitherto experienced in the manufacture of collapsible tubes, containers and closure means therefor, in providing a closure joint resistant to the specific chemicals which may be contained within the contents of said cans, containers, tubes, bottles or the like. By employing plasticizable composition material I have been able to select the materials of which the valve is made to make it resistant specifically against the known chemicals in the contents of the container, for instance, resistant to mild acids, alkalis, alcohol, other solvents etc., and I therefore construct the material of which my valve is preferably made of predetermined chemical characteristics to be so resistant.

Further objects of my invention are not only to provide a nozzle closure means of the type mentioned above which may be readily and simply manufactured, but also to provide one which will positively oscillate and which will function to close or open the nozzle at all times. I preferably provide a turning lug projecting upwardly through the open end of the nozzle to limit the oscillatable movement of the valve member from an open to a closed position by the sides of said lug abutting the sides of the upper end of the nozzle. I also provide means to positively pivot the valve member on a defined horizontal axis so that it may positively function at all times and not tend to slip around within the valve seat, so that the end or ends thereof will not come into accurate alignment with the nozzle end or ends. In order that the turning lug may positively function to both open and close the valve, I construct it so that in closed position the upper surface thereof projects substantially tangentially from the top of the valve, so that it may be readily opened and provide the end of said lug having a tangential upper surface with an upturned portion to form an upwardly projecting tip or projection for the ready oscillation of said valve from an open to a closed position.

Further features of my invention relate to the improved method of manufacture of and certain details of construction thereof so that it may be readily manufactured in a commercial and practical manner. Thus I preferably mold the valve closure member with flattened opposite sides to assist in forming an axis of rotation therefor and I provide centrally thereof outwardly projecting pivot lugs of a length with the said adjacent central valve portion of substantially the exact diameter of said sphere, so that if the valve be molded in hemi-spherical molds, the mold line will substantially pass through the centers of said flattened side portions and said lugs to permit the ready removal thereof in an easier manner than if indentations were provided in said flat portions which would be hard and almost impossible to remove from the molds, and as the total length of said pivot lugs taken through the axis thereof is not greater than that of the diameter of said sphere so that they may be more readily removed from the molds. A further detail in the construction of my valve which makes pressure molding thereof possible is the particular shape of the turning lug I preferably employ which includes a curved lower surface and a flat upper surface substantially tangential to said spherical valve and terminating in an upwardly bent outer end meeting said lower surface to form an outwardly projecting lug being so shaped for a double purpose namely so that said integrally molded lug may be readily pivoted out of a hemispherical valve mold by pivoting it therefrom on the point of contact of said mold with the lower surface of said lug, and to provide a turning lug engageable by the finger which will oscillate the valve in either direction.

A further feature of my valve construction is that I provide means for readily pivotally attaching it on a fixed axis within the relatively thin upper portion of the nozzle wall, it being necessary to insert the valve closure member within the partially spherical extruded recess or lower valve seat portion and press inwardly diametrically opposite portions of said relatively thin nozzle upper wall against said diametrically opposite flat valve portions to cause the pivot lugs to be imbedded within the nozzle wall to form sockets to receive said pivot lugs to provide an axis of rotation for said valve.

Further features of the inherent construction of my improved closure device are that I provide a nozzle which may be readily extruded from a circular, annular or other type of blank in the form of a nozzle having a partially spherical lower valve seat portion in a thickened or lower portion thereof and a relatively thin upper wall projecting substantially vertically upwards from said lower valve seat portion which after the insertion of the valve member therein may be readily crimped downwardly over said valve to provide a supplemental partially spherical upper valve seat portion for the upper portion of said valve to firmly retain it in position against said washer where employed and said lower valve seat portion formed during the extrusion process.

A further feature of my particular construction is that the countersunk annular recess for receiving the washer may be readily extruded in the valve seat simultaneously with the extrusion of the nozzle and also if desired supplemental metal saving recess means formed in the lower surface of said thickened portion to save the expense of additional metal or, if desired, the valve seat may be formed from an inwardly depending annular flange projecting inwardly from said nozzle. If desired, however, the countersunk washer receiving recess may be readily formed in the upper portion as well as the lower portion of said valve seat during the extrusion process.

Further objects of my invention therefore are to provide a novel method of pressure molding of selected predetermined chemical resistant composition material in which a valve of the desired type may be readily made at a minimum cost.

Further objects of my invention are to provide a novel type of extrusion apparatus and process for manufacturing the nozzle portion of my invention with a suitable lower partially spherical valve seat portion in a thickened portion of said nozzle preferably having a countersunk washer receiving recess therein and with the lower surface of said thickened portion underneath said valve seat being partially removed to save metal; preferably extruded simultaneously with a flange projecting outwardly from a downwardly depending nozzle extension or a complete container or tube as shown.

Further features of my invention relate to the various features of construction of my valve and nozzle members hitherto described which function to provide a novel method of assembling them into a nozzle closure unit which may be entirely manual, semi-automatic, or completely automatic.

Further features of my invention are to provide an improved apparatus for such assembly, being either fully automatic or requiring at the most a single operator. By providing the valve structure hitherto described and the valve seat structure also described in said nozzle, I have provided a construction whereby the nozzle may be readily mounted on a rotatable ring or conveyor and the following sequence of steps performed thereon during intermittent intervals of movement of said rotatable ring or conveyor, namely, (1) the mounting of said nozzle on suitable means on said conveyor, (2) manufacture, shaping and insertion of the fibre washer within the countersunk valve seat in the lower valve seat portion of said nozzle or upper valve seat portion, if desired, (3) the insertion of the oscillatable valve closure member so as to abut said washer and lower valve seat nozzle portion in correct alignment, (4) the downward crimping of said nozzle upper wall to provide a partially spherical upper valve seat portion enclosing said valve member and firmly securing it against said washer and said lower valve seat portion, (5) the inwardly pressing diametrically opposite flattened valve portions to form flat abutting surfaces to accurately align the axis of oscillation of said valve within said nozzle and to simultaneously press the pivot lugs where employed into the relatively thin nozzle wall to form sockets therein to receive said pivot lugs to positively provide an axis of rotation for said valve member to keep the discharge passage thereof in the desired alignment with the dispensing holes at the upper and lower ends of said nozzle when in open position, (6) oscillating said valve turning lug to move said valve member to a position closing said nozzle either by hand or by automatic means if desired, (7) again crimping the upper portion of said nozzle wall over said valve member to align said hollow upper valve seat portion and seal said valve in a shipping position and, (8) removing said assembled nozzle from said conveyor or ring. If desired, however, the first and second crimping steps and inwardly pressing axis forming steps may be performed simultaneously, the portions of the upper side wall of the nozzle being pressed inwardly against the flat diametrically opposite valve side portions to provide the flat abutting surfaces and lug sockets to provide a true axis of oscillation for said valve member while the upper end of said nozzle wall portion is being bent downwardly over the upper surface of said valve to form the upper valve seat portion, it being apparent that these two operations are performed simultaneously with the crimping step, preferably maintained slightly longer. In my preferred embodiment, I have shown mandrel means for supporting the nozzle during this sequence of steps and indexing means to advance said ring or conveyor amounts to progressively change stations to permit the above described sequences of assembly steps to be performed thereon during the intervals between said progressive advancements. It is obvious that any type of continuous conveyor may be employed and in my preferred embodiment I preferably employ a ring rotatably mounted on a suitable standard on which the desired tools to accomplish the steps described are mounted on the respective stations thereof to perform the actual work thereon at these stations between the intermittent intervals of movement of said conveyor or ring.

Further features of my invention are therefore to provide a novel type of apparatus for this method of assembly which may be done either by hand, semi-automatically, or fully automatically to save the number of operatives required.

While my invention is particularly applicable for use in the manufacture of collapsible tubes, cans, containers, etc., which may have either the upper portion or entire body thereof simultaneously extruded with the formation of the nozzle, it is apparent that my invention may be equally applicable to bottle closures which may also be provided with an outwardly projecting annular flange analogous to a can or container top or collapsible tube top and if desired the nozzle portion may be extended below said spherical valve seat portion in the extrusion process to provide means whereby an annular cork or other device may be employed to surround said extruded nozzle for insertion within a bottle neck. If desired, the entire valve closure member may be constructed hollow and the valve seat portion of the nozzle similarly enlarged if necessary so as to receive and dispense a predetermined bulk of powder, liquid, or other material contained within said hollow valve. For this purpose I preferably provide the hollow valve seat portion with a single discharge end and I preferably construct the cooperating surfaces of the nozzle side wall and the nozzle inlet and outlet holes so that the predetermined bulk holding hollow valve may be moved to three positions, namely (1) a position to fill said hollow valve when the bottle or container is in inverted position, (2) to a loaded position in which the hollow valve is turned so that the discharge vent is completely sealed by the side wall of the nozzle, which position may provide a convenient loaded position taking a much less time to dispense from than if first filling the hollow valve portion and immediately discharging it, and (3) to a position bringing the discharge vent in the hollow valve member into substantial alignment with the nozzle discharge hole for discharging. This specific embodiment of my invention is specifically adapted for use when serving liquors at a crowded bar, as the bar-keeper may at intervals load up the hollow valve member and pivot it to loaded or cocked position again ready for immediate dispensing.

These and such other objects of my invention as may hereinafter appear will be best understood from a description of the accompanying drawings, which illustrate various embodiments of my invention applied to collapsible tubes, or containers, bottle-tops, and various steps in its method of manufacture and apparatus suitable therefor.

In the drawings

Figs. 11 to 18 show my invention as applied to a bottle or container top.

Figures 1, 2, 3, 4, 5, 6, 7, 8, 9, 10:
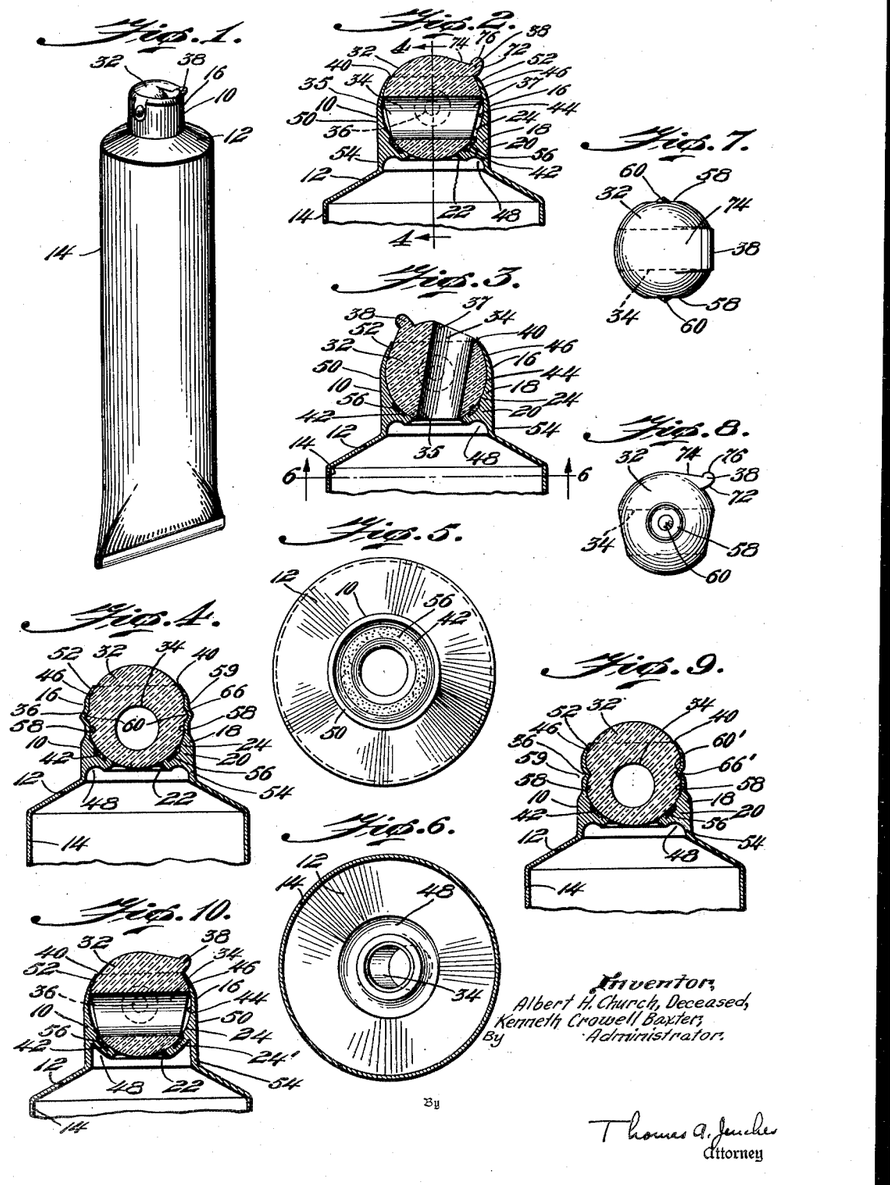
Fig. 1 is a perspective view of a collapsible tube equipped with my invention.
Fig. 2 is a vertical sectional view of the upper portion of said collapsible tube including the nozzle portion thereof with the valve closure member thereof in closed position.
Fig. 3 is a vertical sectional view similar to Fig. 2 with the valve member oscillated to an open dispensing position.
Fig. 4 is a vertical sectional view taken along the line 4—4 of Fig. 2 at right angles to the section shown therein to illustrate the improved means I preferably employ for positively providing an axis of oscillation for the valve closure member within the tube nozzle.
Fig. 5 is a plan view of the tube prior to the assembly of the valve closure member therein, showing the washer in the countersunk recess of the lower valve seat portion thereof.
Fig. 6 is a cross sectional view taken along the line 6—6 of Fig. 3 looking upwardly at the lower end of said nozzle and attached valve member.
Fig. 7 is a plan view of the improved valve member I preferably employ.
Fig. 8 is a side elevation of the improved valve member I preferably employ.
Fig. 9 is a vertical sectional view taken along the same section line as Fig. 4 illustrating an alternative type of pivot means for my invention including recesses in the valve member adapted to receive inwardly projecting lugs from the nozzle side wall.
Fig. 10 is a vertical sectional view generally similar to Fig. 8 of a different embodiment of my invention but employing a lower valve seat forming downwardly projecting flange projecting inwardly from the nozzle wall to provide a yieldable lower valve seat and to save metal in the manufacture thereof.
Figures 11, 12, 13, 14, 15, 16, 17, 18:
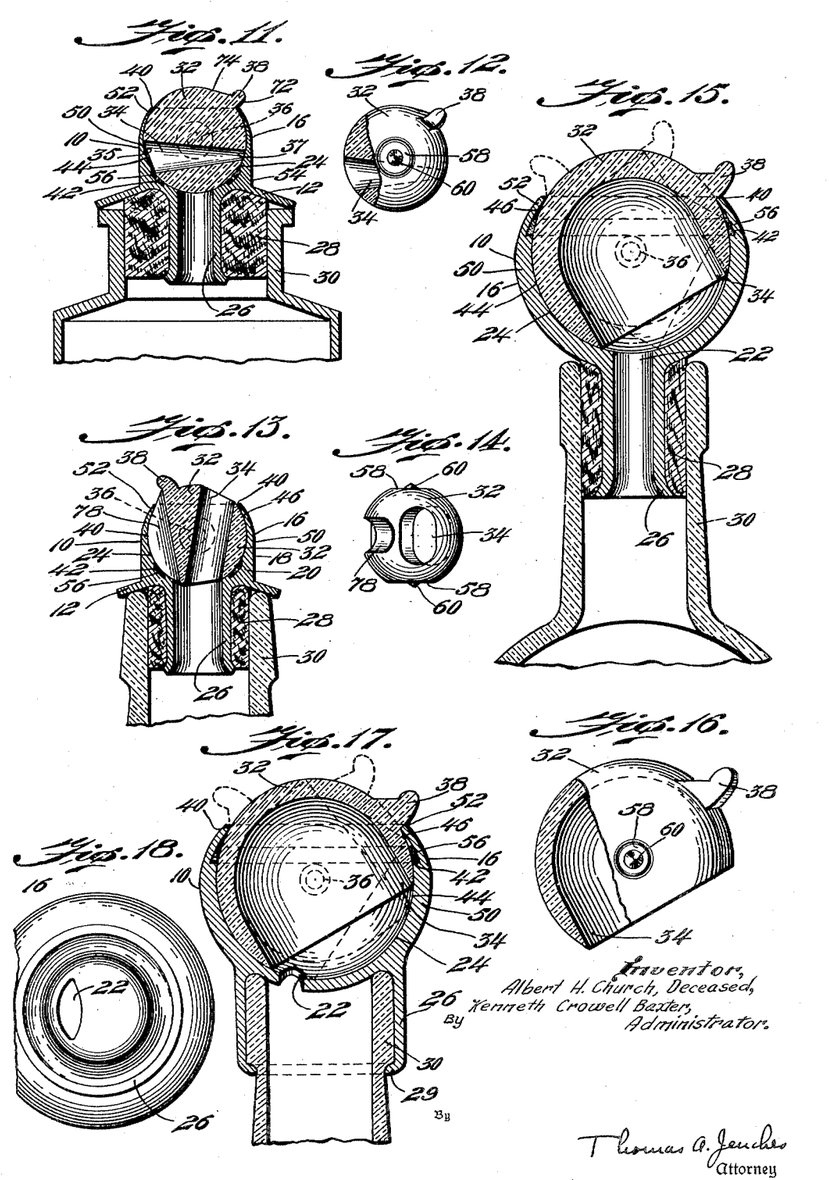
Fig. 11 is a cross sectional view illustrating an embodiment of my invention having a nozzle extension projecting downwardly from the valve seat portion surrounded by a cork for ready insertion within the bottle neck, the passage through the valve member being preferably of a size to dispense a single drop at a time.
Fig. 12 is a side elevation partially broken away of the valve member shown in Fig. 11.
Fig. 13 is a vertical sectional view similar to Fig. 11 of an alternative embodiment of my invention in open position showing a supplemental air inlet port in the valve member to permit the more rapid dispensing of liquid therefrom.
Fig. 14 is an inverted plan view of the valve member employed in the embodiment shown in Fig. 13.
Fig. 15 is a vertical sectional view of an embodiment of my invention for dispensing liquid of the type shown in Fig. 11 in which, however, the valve member is made hollow and of a size to permit the dispensing of a predetermined bulk of liquid, shown in full lines in filling position, in dotted lines in a loaded position and again in dotted lines in a dispensing position.
Fig. 16 is a side elevation partially shown in section of the improved type of hollow valve member I employ in the embodiment shown in Fig. 15.
Fig. 17 is a vertical sectional view of an embodiment of my invention adapted to dispense powder of the same general type as that shown in Fig. 15 for dispensing liquids and with the valve member shown in the positions shown therein in full and dotted lines respectively, in which the nozzle member extension is enlarged to be secured over the outside of a bottle neck to be attached thereto.
Fig. 18 is a reverse plan view of the type of powder dispenser employed in Fig. 17.

In the drawings, wherein like characters of reference indicate like parts throughout, 10 generally indicates a nozzle closure means for containers, constructed in accordance with my invention. The nozzle closure means 10 may have the annular flange 12 projecting radially outwardly and also downwardly therefrom to which the side wall 14 of the collapsible tube may be attached, or if desired, my nozzle closure means 10 may be employed as a bottle top as shown in Figs. 11 and 13. My improved nozzle closure member 10 includes a preferably hollow preferably extruded preferably metal nozzle member 16, preferably having the lower portion 18 thickened as at 20 and having a central dispensing hole means 22 therein, said lower portion 18 preferably having a partially spherical preferably slightly yieldable lower valve seat portion 24 on the inner surface thereof extruded thereon at the same time that the nozzle portion 16 is being extruded, and also extruded simultaneously with the flange 12 if employed, and the container or tube side wall 14 or, if desired, simultaneously with the nozzle extension 26 as shown in Figs. 11, 13 and 15. In the embodiment shown the lower valve seat portion 24 is preferably substantially hemispherical. The flange 12 may, as shown in Fig. 1, be the means to secure said nozzle member to a container, bottle, tube, can or the like such as by forming the wall 14 integral therewith as shown in Fig. 1 or other means may be provided, if desired, to secure said bottle, tube, can, container or the like, such as by providing an annular cork member 28 adapted to surround the extruded nozzle portion 26 as shown in Figs. 11 to 15 adapted to be slightly yieldable contained within the bottle neck.

My invention broadly includes a preferably substantially spherical valve closure member 32 mounted within the upper end of said nozzle 16 and provided with a discharge vent or passage 34 and a suitable axis of rotation 36 and preferably a turning lug 38 whereby said valve closure member 32 may be oscillated to positions bringing the discharge vent or passage 34 thereof in alignment with the inlet hole 22 in the lower portion of said nozzle and/or the outlet hole 40 in the upper portion of said nozzle. While I am aware that substantially spherical valve closure members of this general type have hitherto been provided for nozzles, so far as I am aware they have tended to leak, and to aid in preventing the leakage thereof I have provided washer means 56 adaptably to be countersunk within the valve seat 44 formed in said nozzle. Said valve seat 44 includes the lower valve seat portion 24 and the upper valve seat portion 46 to be described. Where a collapsible tube is employed I preferably suitably countersink the circular washer 56 in a countersunk recess 42 in the lower valve seat portion 24, but may, if desired, as shown in Figs. 15 and 17 countersink said washer recess 42 in the upper valve seat portion of the nozzle.

As to be explained later in connection with Figs. 19 to 22, I preferably extrude my improved nozzle member 16 and simultaneously provide it with a lower valve seat portion 24 in a thickened portion of said nozzle and I may simultaneously therewith extrude the annular washer receiving recess 42 therein. In order to save metal I also preferably provide metal saving recess means preferably in the form of an annular groove 48 on the lower surface of said thickened portion 20 or I may, as shown in Fig. 10 so construct the recess 48 as to substantially form as the lower valve seat portion 24 the annular slightly yieldable flange 24' projecting arcuately inwardly substantially centrally of the side wall 50 of said nozzle. In my preferred embodiment each recess, namely the washer receiving recess 42 and the annular metal saving recess 48, are preferably concentric with the dispensing hole means 22 in the lower portion of said nozzle substantially centrally of the lower substantially hemi-spherical valve seat portion 24. After the extrusion process, the upper portion 52 of the side wall 50 of said nozzle projects substantially vertically upwardly from the upper edge of said lower valve seat portion 24. In the embodiments shown in Figs. 1 and 22, the annular flange 12 projects outwardly and downwardly from the lower portion 54 of said nozzle wall 50.

As stated hitherto, in order to prevent leakage through my improved valve closure means 10, I preferably provide a washer 56, mounted in said countersunk annular washer receiving recess 42, preferably constructed of fibre, leather, rubber or other suitable preferably resilient material of a greater thickness than the depth of said recess 42 to at all times closely engage the oscillatable valve closure member 32 to form an air and liquid tight seal at all times therewith, and being constructed preferably of material where liquids are employed resistant to the chemical constituents thereof.

In the preferred embodiment shown, I preferably extrude the nozzle portion 16 and integral flange 12 where employed and tube or container side wall 14 where employed or nozzle extension 26 where employed of metal. And whereas I may make my improved valve member 32 of metal to metal contact, this is not at all times thoroughly air and liquid proof and I therefore preferably construct my improved substantially spherical valve member 32 of predetermined chemical resistant composition material and one of which the constituents thereof may be predetermined to be resistant to any specific chemicals contained in the contents of the container, such as mild acid, weak or strong alkali, alcohol, or other solvents, etc. Said improved valve member 32 is pivotally oscillatably mounted on said valve seat 44 on a horizontal axis 36 against said washer 56. In order to provide a suitable axis of rotation and a construction which may be pressure molded in two superimposed substantially hemi-spherical molds, I provide diametrically opposite flattened side portions 58 on said valve member 32 as more particularly shown in Figs. 4, 7 and 8 provided with pivot lugs 60 preferably having rounded ends as shown and preferably projecting outwardly centrally of said flattened side portions 58, and of a length with said adjacent central valve portion, of substantially the diameter of the sphere of which my improved valve member is preferably molded for a double purpose, (1) so that lugs 60 will not be of such a length as to prohibit their being removed from the molds, they being normally so placed as to lie substantially on the mold line between the two hemi-spherical molds and (2) so that they may be readily dropped to the desired feeding position within the diameter of said nozzle against the partially spherical lower valve seat portion 24 thereof. Portions of said nozzle member side wall 50 are diametrically pressed flatly inwardly as at 59 against said flattened valve sides 58 to assist in providing an axis of oscillation for said valve portion 32 and to form sockets 66 therein as shown in Fig. 4 to receive said pivot lugs 60 diametrically of said wall 50 to provide an axis of oscillation for said valve member 32, and the upper portion 52 of said vertical nozzle member side wall is preferably crimped downwardly over said rotatable valve member to form a hollow partially spherical upper valve seat portion 46 having a central dispensing hole means 40.

Said valve member 32 is also provided on the upper end thereof with a turning lug 38. Said lug 38 is preferably formed with a curved lower surface 72 and a flat substantially tangential upper surface 74, terminating in an upwardly bent rounded outer end 76 meeting said curved lower surface 72 to form an outwardly projecting lug 76 projecting radially outwardly from said valve member 32, being thus shaped for a double purpose, (1) so that said turning lug may be readily removed from a hemi-spherical mold on pivoting said closure member therefrom, the inner end of the lower curved portion 32 forming an axis for said pivoting, and (2) to provide means whereby the closure member 32 may be readily oscillated in either direction, namely, to open by grasping underneath the lower curved portion and to close by grasping the inner portion of the upwardly projecting lug 76 thereof, thus providing means to oscillate said valve an amount limited by said turning lug 38 abutting opposite edges of said dispensing hole means 40 in said hollow crimped upper valve seat portion 46. As stated, said valve member 32 is also preferably provided with a discharge vent 34 either at one end thereof or passing therethrough of such a size and located relative to the center of said valve, and said nozzle side wall 50 and the upper and lower dispensing holes 40 and 22 respectively of said nozzle 16 are of such a size and shape that said discharge vent or passage 34 may be rotated into alignment with the respective discharge hole means 40 and 22 in the hollow ends of said nozzle valve seat 44 with the outwardly projecting end 76 of said lug abutting one edge of said upper valve seat hole or said valve member 32 with its discharge passage 34 may be oscillated to have the respective upper end 35 and lower end 37 thereof closed by said nozzle side wall 50, with the lower portion of said side wall 72 of said turning lug substantially abutting the other end of said upper valve seat hole 40, if desired.

While the improved washer 56 is highly desirable, it may, if desired, be omitted or inserted as shown in Fig. 15 in a suitably countersunk hole 42 in the upper valve seat portion 46. While I have shown, for reasons to be explained, my improved type of means for oscillatably pivotally mounting the valve closure member 32 in said nozzle, in place of the pivot lugs 60 hitherto described, I may as shown in Fig. 9 provide suitable sockets 60' in the flattened side portions 58 of the valve member to receive the pivot lug 66' formed from the nozzle side wall 52 when diametrically opposite portions of said side wall are pressed inwardly as hitherto explained The vent or passage 34 of my improved valve member is preferably shown located substantially near the center thereof and passing therethrough but it is obvious that if desired it may be located along the side thereof as suggested in Fig. 13 or through any portion thereof. It is also obvious that the valve seat 44 including the lower valve seat portion 24 and the upper valve seat portion 46 may be formed in any other desired manner than in the manner shown. While I preferably employ an extruded metal nozzle it is apparent that if desired the nozzle portion may be molded or extruded out of composition or other like material, cast or otherwise fabricated and while I have preferably constructed my improved valve closure member of molded composition material, it may if desired be suitably fabricated in any desired manner out of other material. As explained hitherto, by constructing the valve seat of slightly yieldable metal material and by constructing the valve of slightly yieldable composition material I have found that a true cooperation exists therebetween, providing substantially an air and liquid proof joint at all times and one in which there is substantially no wear as in a metal to metal contact, permitting the use of my improved nozzle closure means over a long period of time. In order that a more slightly yieldable lower valve seat portion 24' may be provided, a larger metal saving recess 48 may be provided and particularly when extruding aluminum I may extrude the lower valve seat 24' in the form of a slightly yieldable annular flange depending arcuately inwardly from the center portion of the nozzle side wall to the central dispensing hole 22.

As explained, I have shown in Fig. 5 the axis of rotation of the valve member 32 on said nozzle member 16 formed not only by the flattened side portions 58 of the valve and adjacent flat portions 59 of the nozzle side wall but in place of the pivot lugs projecting outwardly from the valve into sockets 66 formed in the adjacent nozzle wall, I have provided the recesses 60' in said valve to receive the pivot lugs 66' formed in said nozzle side wall when said nozzle side wall is pressed inwardly on diametrically opposite points thereof in the manner hitherto explained and as shown in Fig. 9.

I have shown in Figs. 11 to 18 various forms of my invention particularly adapted as closures for bottle tops: the embodiments shown in Figs. 11 to 14 being constructed substantially similarly to my invention as shown in Fig. 1 applied to a collapsible tube except that the side wall of the tube 14 is omitted from the flange 12, the nozzle 16 is extended downwardly as at 26 and provided with an annular cork ring 28 for securing my improved closure means within the bottle neck 30.

In the embodiment shown in Figs. 11 and 12, the discharge passage 34 of said valve may be tapered as shown and of a size to dispense a single drop at a time from the interior of said container 31. The embodiment shown in Figs. 13 to 14 may as shown be applied to the neck 30 of a liquor bottle and in addition to the discharge passage 34 is provided with the air inlet passage 78 to rapidly admit air within the bottle to permit the rapid discharge of the liquid contents thereof through the discharge passage 34 of said valve member 32. It is apparent, however, that the discharge passage 34 may be constructed at the side of the closure instead of through it as the air inlet passage 78 shown in Fig. 14 or that said discharge passage 34 may comprise any desired part of a sphere up to a hemisphere. If the discharge passage 34 be located at the side however and substantially enlarged, it is not anywhere near so desirable as the type specifically shown herein for ease of manufacture and assembly but may for some features of my invention be provided.

I have shown in Figs. 15 to 18 embodiments of my invention adapted to dispense a measured dose of predetermined bulk from the container and for this purpose I have enlarged the vent 34 so as to substantially take up the entire interior of said valve member 32 and I have correspondingly enlarged the adjacent substantially spherical valve seat portion 44 of said nozzle wall. The hollow closure and vent are preferably of such a size and shape and said nozzle side wall and lower and upper dispensing hole means 22 and 40 thereof respectively are preferably of such a size and shape that said hollow closure vent 34 may be rotated into alignment with said lower dispensing hole means 22 when said closure means is inverted to permit reception of said measured dose or quantity within said hollow closure member with said turning lug 38 abutting one edge of said nozzle hole means 40, oscillated against the friction of said composition closure member 32 against said metal valve socket 44 to bring said hollow closure vent 34 opposite said nozzle side wall 50 into intermediate loaded or cocked dose or drink-holding position, so as to be frictionally retained therein, or rotated into alignment with said upper dispensing hole means 40 to expel said measured dose therethrough with said turning lug 38 substantially abutting the other edge of said upper nozzle hole means 40. I have shown in Fig. 15 this embodiment of my invention applied to a neck 30 of a liquor bottle provided with the elongated nozzle extension 26 and being secured within said neck by the annular cork 28, the flange 12 in this instance being omitted: While it is possible to extrude this nozzle it is not so easy as the extrusion of the other nozzles shown and described hitherto and if desired the nozzle portion 16 may be cast, stamped or otherwise shaped for this embodiment. I have shown in Figs. 17 and 18 an embodiment of my invention similar to the embodiment shown in Figs. 15 and 16 but particularly adapted for dispensing a measured dose of powder. In this instance the lower nozzle discharge port 22 is made relatively small so that the closure member 32 may be oscillated or rotated into three positions, namely the filling, loading, and dispensing positions as shown in full or dotted lines respectively therein. In this instance the lower nozzle extension 26 is widened to fit outside of the neck 30 of the bottle and is provided at its lower extremity with the inwardly projecting lip 29 providing means to secure my improved nozzle closure member 10 to the bottle. In this embodiment the nozzle means 16 may be conveniently molded.

As stated hitherto, I have preferably provided in the specific details of my construction both a valve closure member 32 which may be readily fabricated in a simple manner and a nozzle portion 16 which may be also extruded or otherwise fabricated in a simple manner, the nozzle being preferably constructed of metal and the valve member being preferably constructed of molded composition material so as to yieldingly abut each other and form an air and liquid tight non-wearing joint in use better than it is possible to obtain by composition against composition or metal against metal. I have also constructed the details of my improved valve structure with a view to a simple method of its manufacture. I thus, as explained, provide a substantially spherical slightly yieldable closure valve member preferably consisting of hemi-spherically molded predetermined chemically resistant composition material having the diametrically opposite flat sides 58, having the pivot lugs 60 projecting outwardly centrally thereof, of a length with said adjacent central valve portion of substantially the diameter of said valve for easier removal from a hemi-spherical mold and for easy insertion within said nozzle member with said mold line passing therethrough and a turning lug 38 at the upper end thereof preferably having a curved lower surface 72 and a flat substantially tangential upper surface 74 terminating in an upwardly extending outer end 76 meeting said curved lower surface 72 to form an outwardly projecting turning lug 76 shaped to be removed on pivoting thereof from said hemi-spherical valve mold and a discharge vent 34 therein or therethrough substantially at right angles to the diametric axis of said pivot lugs 60. As stated hitherto, my improved valve closure member may be constructed in this specific manner out of any suitable material, but for the reasons described and for the additional reason that composition material may be brightly pigmented or otherwise colored with any desired color to provide an attractive contrast with the metal nozzle, I preferably construct it of predetermined chemical resistant composition material. While I have preferably formed the axis of rotation thereof by providing the substantially spherical closure member with diametrically flattened sides 58 and pivot lugs 60 projecting outwardly centrally thereof of less total length than the diameter of said sphere for easy withdrawal from the mold and insertion within the nozzle, it is obvious that in place of pivot lugs I may provide the pivot recesses 60' as shown in Fig. 10 or other types of pivot means, such recesses or other types of pivot means being not however so easily withdrawn from the molds, and I may in place of the side portions 58 and lugs 60 provide any type of oscillation axis forming means. While the turning lug 38 at the upper end of said closure means is preferably constructed in the manner described with a double function of easy removal from the mold and being operable to be actuated by a finger to readily oscillate the valve in either direction, it may if desired be constructed in other ways than in the specific manner shown.

As stated hitherto, for the reasons given above and as a plastic composition material may be readily pigmented or otherwise colored to provide an attractive appearance, I preferably construct my substantially spherical closure member of hemi-spherically molded, predetermined chemical resistant composition material. While any suitable type of plasticable composition material may be employed, I preferably employ one of insoluble phenol formaldehyde, intermediate condensation product type such as Bakelite, or insoluble urea formaldehyde intermediate condensation product or an insoluble cellulose acetate product or in fact any suitable type of moldable preferably resilient composition material. With the widespread range of composition materials possible, it is obvious that I am able to select a composition material particularly resistant against the chemicals in the known contents in the container for which my improved nozzle closure means is desired to be used. Thus for instance, if it would be desired that the closure member be resistant to alkali or weak acid, I preferably employ an alkali or acid resistant insoluble phenol formaldehyde intermediate condensation product specially treated to make it acid and/or alkali resistant. If I desire a valve member resistant to alcohol, I preferably employ an insoluble urea formaldehyde intermediate condensation product or I may if desired employ a cellulose acetate product or any of a great many possible composition materials preferably so selected as to be resistant to the particular chemicals in the contents of the container.

Employing these materials it is possible to manufacture my improved valve member 32 by pressure molding in two superimposed hemi-spherical molds. The hemi-spherical molds are preferably so shaped as to provide the flattened sides 58 and the pivot lugs 60 projecting outwardly therefrom substantially centrally between the hemi-spherical molds of a length with said adjacent central valve portion of substantially the diameter of said valve and molds. It is apparent therefore that the mold line will be formed substantially centrally of the flattened portions 58 and through the pivot lugs 60 to permit the easy withdrawal of said pivot lugs from the mold. Thus the particular construction I employ to provide an axis of rotation for the valve member is constructed with a view of its easy manufacture or molding.

One of the molds is also shaped to provide said closure member with a turning lug 36 at the upper end thereof in the manner hitherto described namely preferably with a curved lower surface 72 and a flat substantially tangential upper surface 74 terminating in an upwardly bent rounded outer end 76 meeting said lower surface to form an outwardly projecting turning lug 76. To provide the discharge vent passage 34 I preferably suitably mount within the molds substantially centrally thereof as desired suitable pin means. When the molding is complete I separate the hemi-spherical molds, remove said pin means from said valve member to provide a discharge vent in said valve member substantially at right angles to the diametrical axis of said pivot lugs and pivot said valve member substantially at about the point where the lower lug surface 77 joins the valve member to remove said turning lug from its hemi-spherical mold. If desired, the pin means may project through the molds to assist holding them together and may be removed prior to separation of the hemi-spherical molds.

Figure 19:
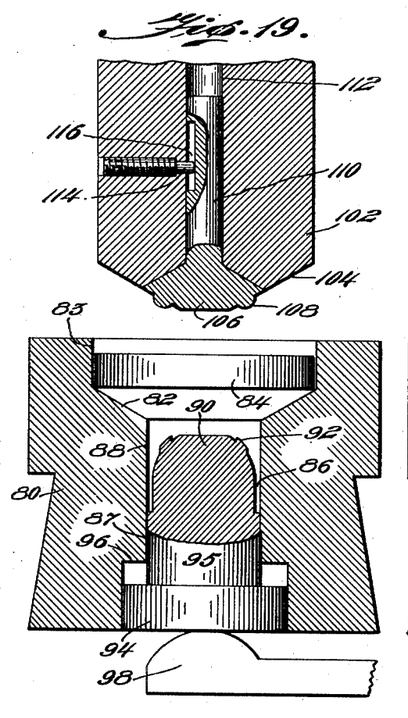
Figs. 19 and 20 are enlarged sectional views of the extrusion punch and die members I preferably employ, Fig. 19 showing the punch and die members separated and a tube blank inserted in the die member, and Fig. 20 showing the punch member lowered into pressing relationship with the die member to simultaneously form the nozzle portion of my invention with a partially spherical valve seat portion in the thickened lower portion of the nozzle thereof preferably provided with an annular washer receiving recess and a cut-away portion in the under surface of said thickened valve seat forming portion and the usual annular flange or top and side wall of a collapsible tube.
Figure 20:
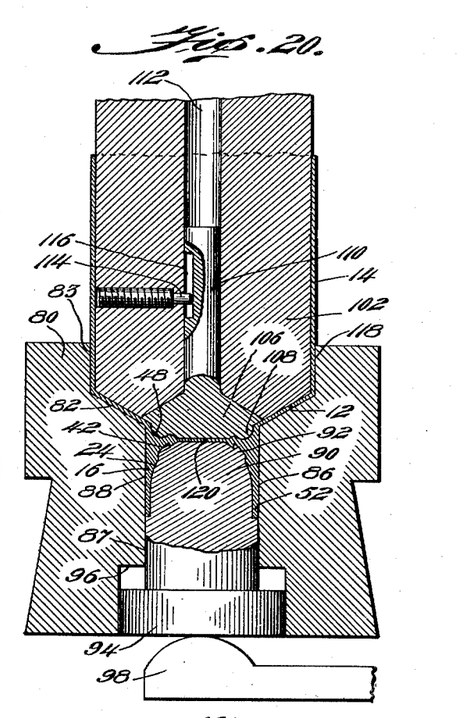
Figure 21:
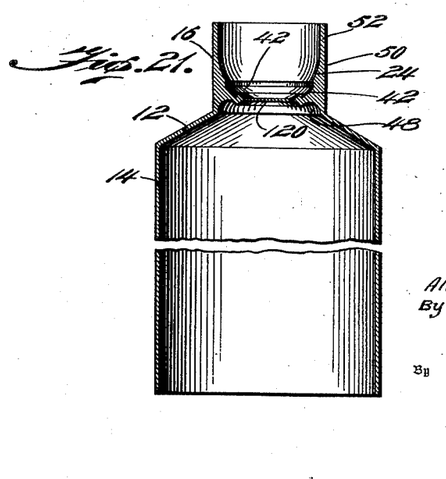
Fig. 21 is a vertical sectional view of a collapsible tube extruded according to the method illustrated in Figs. 19 and 20 provided with a partially spherical lower valve seat portion in the lower portion of the nozzle thereof and with the upper portion of the nozzle wall projecting substantially vertically upwardly from said lower valve seat portion, said lower valve seat portion being preferably also provided with an annular washer receiving recess and having the under portion underneath said lower valve seat portion removed to save metal.
Figure 22:
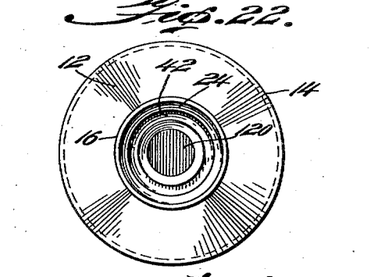
Fig. 22 is a plan view of the intermediate product shown in Fig. 21.
Figure 23:
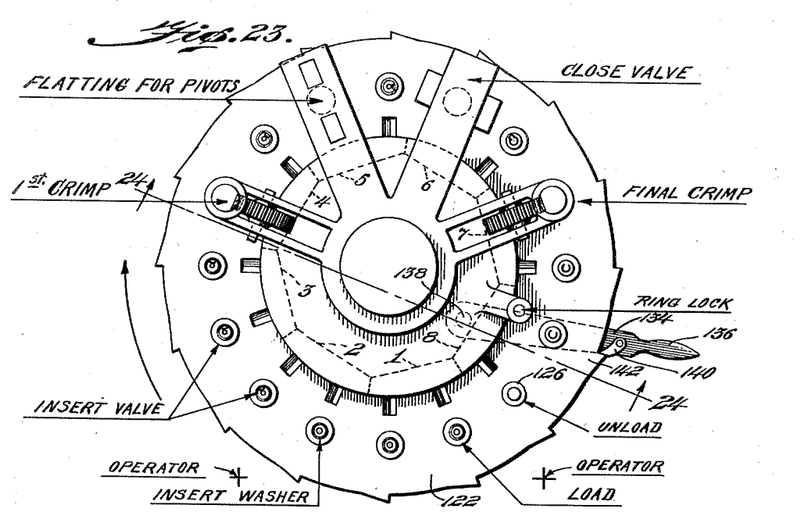
Fig. 23 is a plan view of an apparatus particularly adapted for assembling my improved valve member in its respective nozzle including the assembly of the washer and valve closure member thereof in the lower valve seat portion, the formation of the upper partially spherical valve seat portion formed by crimping the upper portion of the nozzle wall downwardly over said valve, the formation of the axis of rotation for said valve, the closing of the valve and the final crimping operation for shipping purposes.
Figure 24:
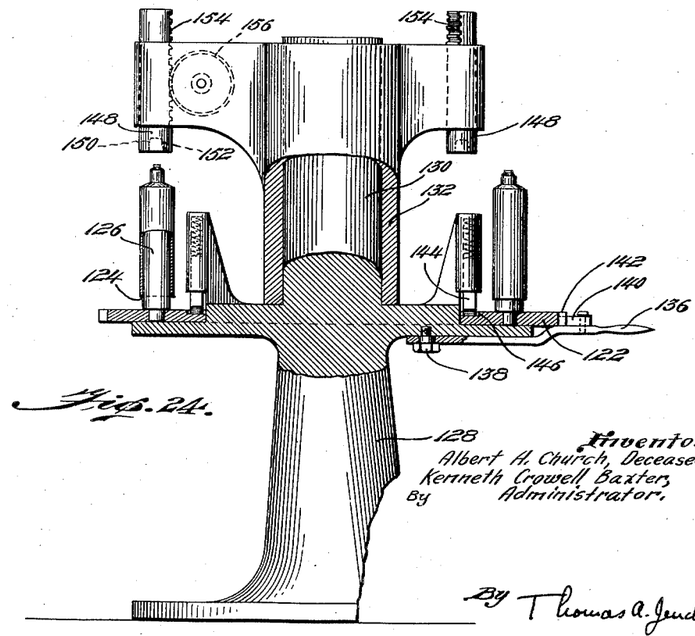
Fig. 24 is a side elevation partially shown in section of the apparatus shown in plan in Fig. 23.
Figures 25, 26:
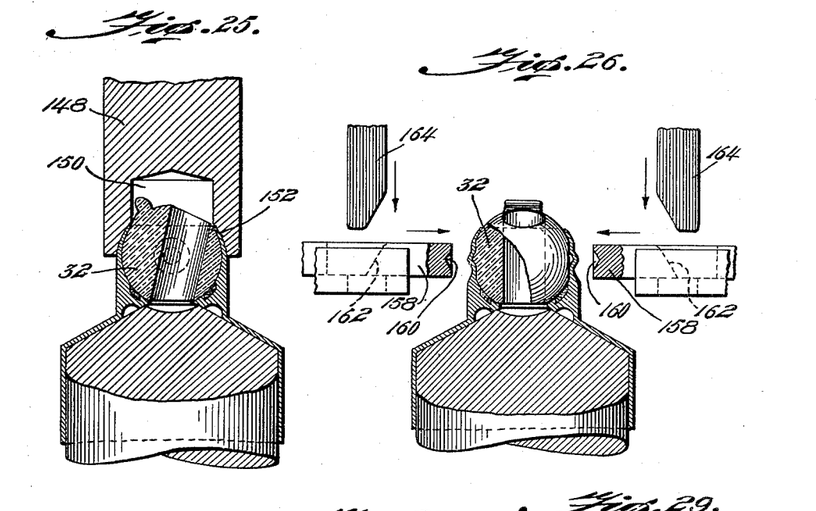
Fig. 25 is a vertical sectional view illustrating the crimping tools I preferably employ in the first crimping step in my improved assembly method.
Fig. 26 is a vertical sectional view of the inwardly pressing tools I preferably employ for pressing the side wall of the nozzle inwardly against the flattened portions of the valve to provide the axis of rotation for said valve.
Figures 27, 28, 29:
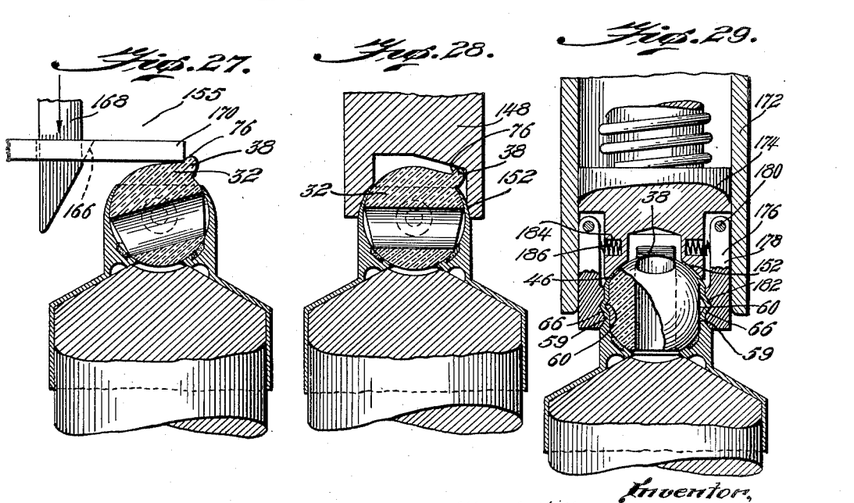
Fig. 27 is a vertical sectional view diagrammatically illustrating the turning mechanism adapted to substantially tangentially abut said lug to turn the valve from an open to a closed position.
Fig. 28 is a vertical diagrammatic sectional view of the means I preferably employ for giving the upper surface of the valve seat portion a final crimping, after the valve has been turned to a closed position.
Fig. 29 is a diagrammatic vertical sectional view of an alternative type of tool which I may employ to simultaneously crimp the upper end of the nozzle side wall to form the upper partially spherical valve seat portion while substantially simultaneously inwardly pressing diametrically opposite portions of the nozzle side wall against the flattened portions of the valve member to form a true axis of rotation for said valve member within said nozzle.

I have shown in Figs. 19 to 20 an improved extrusion press for simultaneously manufacturing my improved nozzle blank member and simultaneously therewith if desired the annular wall 12 and simultaneously therewith the side wall 14 of a collapsible tube or container. For this purpose I provide a female die 80 having an outwardly tapered face 82 for receiving a round, annular or otherwise shaped tube blank 84 and an annular nozzle forming hole 86 depending centrally therein having a cylindrical outer surface 88 and a convex partially spherical valve seat forming inner surface or protuberance 90. To form the annular washer receiving recess 42 I preferably provide said female die with the annular washer recess forming projection 92 thereon. If desired, as shown the valve seat and female forming protuberance 90 is mounted on a plunger 95 slidable within the central bore 87 in said die, a portion of which forms the outer surface of said annular hole 86, said plunger being provided at the lower end thereof with the annular shoulder 94 adapted to abut the shoulder 96 on the lower portion of said die, said shoulder 94 being adapted to be actuated by the lifter cam 98 for a purpose to be described. I provide a cooperating male die 102 of slightly less diameter where a collapsible tube side wall 14 is to be formed than that of said cooperating side wall 83 of said female die and having a cooperating tapered face 104 to cooperate with the tapered face 82 to form the annular flange 12 and to simultaneously extrude said tube side wall or body 14 in the space between the side wall of said male die 102 and the side wall 83 of said female die and a center portion 106 shaped to form with the outer surface 88 of the annular nozzle forming hole 86 in said nozzle 16 and with the inner surface or projection 90 of said annular hole 86 the partially spherical lower valve seat portion 24 on the inner surface of said nozzle, said center portion 106 of said male die being preferably provided with an annular metal saving recess forming projection 108 thereon substantially opposite and inside of the outer edge of said nozzle forming hole 86. The center portion 106 of said male die may be provided with the plunger 110 slidably mounted in the central bore 112 of said male die 102 and having its up and down movement limited by the lug 114 projecting inwardly in a vertical slot 116 in said plunger 110 to limit the up and down movement of said plunger 110 and attached male die center portion 106 for a purpose to be described.

As shown in Fig. 20 when the male die member is compressed downwardly against said blank 84, it presses a portion of said blank against the lower tapered surface 82 of the female die to form the annular shoulder 12 hitherto described and the tube body 14 where employed is simultaneously extruded upwardly in the space 118 formed by the difference in diameters between the hollow female die portion 83 and the male die 102 and a portion of the blank is extruded downwards against the cylindrical outer side wall 88 of said annular nozzle forming hole 86 to abut the central nozzle forming projection 90 of the female die to form said nozzle 16 and valve seat, the annular projection 92 of said projection 90 forming the annular washer receiving recess 42 in said lower valve seat portion 24 and said annular projection 108 forming an annular metal saving recess 48 in the under surface of said simultaneously formed partially spherical lower valve seat portion 24, the substantially vertical cylindrical upper valve seat portion 52 being formed between the outer surface of the projection 90 and the outer surface 88 of the annular female die hole 86. After the tube and nozzle with its integral partially spherical lower valve seat portion 24 have been simultaneously extruded as shown in Fig. 20 and the male die member has been partially removed, the lifter cam 98 raised to simultaneously remove the projection 90 upwardly to free the extruded tube 12, flange 14 and nozzle 16 from the female die, the tube 12, the flange 14 and nozzle 16 are removed from said male die by air pressure forced down the duct 112 in the male die, said air pressure forcing the plunger 110 downwards to lower said center portion 106 against the thin disk or web 120 formed centrally of said lower valve seat portion 24 to free said extruded tube flange and nozzle from said male die. It is thus obvious that I have produced by placing a tube blank in the die and extruding said blank to simultaneously form a tube body 14 and integral preferably tapered annular shoulder 12 and integral nozzle 16 secured thereto having a partially spherical lower valve seat portion 24 on the inner surface of the thickened lower portion of the nozzle provided with an annular washer receiving recess 42 therein and a metal saving annular recess 48 on the under surface of said thickened lower portion, and a substantially vertical inner surface 52 above said valve seat, that I have provided a nozzle portion for a container or a collapsible tube comprising an extruded body 14, an integral annular flange 12 attached to said body 14 and an integral nozzle 16 attached to said annular flange 12 having a side wall 50 having a partially spherical lower valve seat portion 24 on the inner surface of the thickened lower portion 18 thereof preferably adjacent to said tube flange 12 having a continuous annular washer receiving recess 42 in said partially spherical lower valve seat portion 24 formed therein and a metal saving annular recess 48 in the under surface of said thickened lower portion 18, the upper surface of which forms said lower valve seat portion 24 with the inner surface of said side wall 50 projecting substantially vertically upwardly above said lower valve seat portion 24 and as shown a film or disk 120 filming over the lower hole 22 of said nozzle. In practice this film or disk is then removed and this intermediate extruded product is then ready for the attachment of the valve closure member described above therein.

Further features of my invention relate to the novel type of apparatus and the method I employ in assembling the valve closure member 32 within said nozzle 16. It is obvious that both the nozzle member 16 and closure member 32 are designed with the view of permitting the easy assembly thereof. I have shown in Figs. 23 to 29 a suitable type of apparatus for this purpose which broadly includes a conveyor 122, movable predetermined amounts to permit the following sequence of steps to be performed thereon substantially simultaneously during the intervals of movement thereof. The entire sequence of steps of assembly are performed on a series of nozzles in one position and the conveyor is moved ahead a predetermined amount and the same sequence of steps is performed all over again on the next adjacent nozzle thus making a sequence of steps to be performed successively on the same nozzle throughout a cycle of assembly on the conveyor. Broadly, I load the free ends 124 of said tubes or nozzles on the holders which preferably contain suitable mandrels 126 mounted at successive spaced distances along said conveyor and I employ mandrel means in the claims to designate any suitable types of holders.

In my preferred embodiment the sequence of assembly steps comprises the following: (1) loading the free end 124 of said collapsible tube or nozzle 16 on said mandrel means 126; (2) inserting the annular preferably fibre washer 56 in said lower partially spherical valve seat portion 24 where the washer be employed and within said annular washer receiving recess 42 where the countersunk washer recess 42 be employed; (3) inserting said substantially spherical preferably resilient valve closure member 32 within said nozzle on said lower valve seat portion 24 over said washer 56 with its turning lug 38 in an upright position thereby providing the discharge vent passage 34 in an open position if a collapsible tube be employed and with the pivot lugs 60 being in a substantially horizontal plane therein; (4) crimping the upper portion 46 of said nozzle member upper side wall 52 downwardly over the upper surface of said valve member 32 to form a hollow partially spherical upper valve seat portion 46 having the central dispensing hole means 40 therein with said turning lug 38 projecting upwardly therethrough; (5) pressing inwardly diametrically opposite center portions of said relatively thin nozzle upper wall as at 59 against said diametrically opposite flattened valve portions 58 to form sockets 66 in said nozzle wall 50 to receive said pivot lugs 60 to provide a horizontal axis of rotation for said valve member 32; (6) oscillating said valve turning lug 38 to move said valve member so that the discharge vent or passage 34 thereof will be opposite the nozzle side wall 50 in a position closing said nozzle; (7) again crimping the upper portion of said nozzle member upper side wall downwardly as at 46 over the upper surface of valve member 36 to realign said hollow upper valve seat portion 46 and seal said valve in a shipping position; and (8) removing said assembled collapsible tube from said mandrel means, where employed, on said conveyor. If desired, step 2 of inserting the annular washer may be dispensed with where said washer is not employed. Said annular washer receiving recess 42 may be dispensed with if it is not desired to accurately align the washer in said lower valve seat portion. Steps 6 and 7 of oscillating said turning lug to close said nozzle and again crimping the upper portion of said nozzle may be dispensed with if desired, or if desired as shown in an embodiment of my invention I may simultaneously press inwardly the diametrically opposite portions of the said relatively thin nozzle upper wall against said diametrically opposite flat valve portions 58 to form sockets 66 in said nozzle wall 50 to receive said pivot lugs 60 to provide an axis of rotation 36 for said valve member 32 while simultaneously crimping the upper portion of said nozzle member upper side wall 52 downwardly over the upper surface of said valve member to form a partially spherical upper valve seat portion 46 having central dispensing hole means 40 with said turning lug 38 projecting upwardly therethrough, preferably continuing the crimping after the diametric inward pressure has been released if desired to firmly seat the valve 32 within its valve seat 44. Thus this simultaneous operation may be substituted for steps 4, 5, 6 and 7.

While the improved hitherto described method may be performed by hand or by machinery in the aforedescribed sequence of steps, I preferably mount said nozzle or tube on said conveyor and move said conveyor predetermined amounts to permit said sequence of steps to be performed thereon preferably simultaneously between the intervals of movement of said conveyor. I have shown in Figs. 23 to 29, however, an improved type of assembly apparatus for use in carrying out said method comprising a central standard 128, a ring or conveyor 122 rotatably mounted in any suitable manner on said standard 128. I have mounted a plurality of nozzle receiving mandrel or holding means 126 at equally spaced points of said conveyor or ring. In the embodiment shown I have arranged for eight steps to be performed on the conveyor and I have shown two mandrels for each step, although if desired one or any number of mandrel means may be provided for each step, the ring or conveyor being advanced proportionate amounts. I thus provide on adjacent portions of said standard a nozzle loading station 1, a washer loading station 2, a closure member loading station 3, a crimping station 4, a pivot fixing flattening station 5, a valve closing station 6, a second crimping station 7, and an unloading station 8.

As indicated hitherto, my improved apparatus may be either operated entirely by hand or partially by hand and partially by machinery thus semi-automatically, or may be operated entirely by machinery or completely automatically. In any event in order that the conveyor or ring may be moved forward predetermined amounts such as to move from one station to the next, I have shown in the drawings suitable indexing means for this purpose to advance said ring equal or other suitable amounts to progressively change stations and for this purpose I have pivotally mounted the lever 134 having the handle 136 projecting outwardly from said ring 122 on the lower surface of said standard as at 138 and I have pivotally mounted substantially adjacent to the outer edge of said ring on said lever 134 the pawl 140 adapted to register against the ratchet teeth 142 projecting outwardly from said ring 122 substantially opposite each individual mandrel and thus being provided in the embodiment shown with two mandrels with adjacent ratchet teeth 142 for each respective station. In order to accurately index or stop the ring so that the mandrel thereof 126 with attached nozzle 16 will be exactly opposite its appropriate tool at the desired station, I provide the spring actuated plunger 144 mounted on said standard overlying a hole 146 for receiving the end thereof in said ring so as to stop each desired mandrel exactly opposite its respective station and overhanging tool where employed.

I have shown in the drawings the loading step at the loading station #1 as being done by hand although if desired this may be done automatically. I have also shown the insertion of the washer to be done by hand at the washer loading station #2 although if desired the washer may be individually formed from a continuous strip of strip material and automatically inserted in the valve seat portion and in the countersunk annular recess 42 thereon by machinery. I have shown in the drawings the valve member 32 inserted on the lower valve seat portion 24 within said nozzle 16 by hand, although it is obvious that by chutes or other means this may be entirely done by machinery at valve loading station #3. It is also obvious that in place of the hand conveyor moving and indexing mechanism shown herein an automatically moving and indexing mechanism may be provided by machinery. I have shown at station 4 crimping means such as the punch 148 provided with the central hole 150, provided with an interior concaved annular crimping surface 152 adapted to abut the upper surface of the nozzle member wall 52 to crimp the upper portion of said nozzle member upper side wall 52 downwardly over the upper surface of said valve member to form a hollow partially spherical upper valve seat portion 46 having central dispensing hole means 40 with said turning lug 38 projecting upwardly therethrough. I have shown the punch member 148 in the drawings provided with the rack teeth 154 on the upper portion thereof and the pinion 156 mounted in said standard to actuate said rack teeth. The pinion 156 may be rotated for this purpose either by hand or by suitable machinery, and I have shown a similar rack 154 to actuate the other means at stations 5, 6, and 7 about to be described. At station 5 I provide diametrically inwardly pressing means mounted on said standard at said pivot fixing flattening station to function with said adjacent mandrel to press the nozzle side walls inwardly at diametric points thereof against the flattened sides 58 of said valve to form the adjacent flattened sides 59 and the sockets 66 to receive the pivot lugs 60. While any means may be provided for this purpose I have shown diagrammatically in Fig. 26 suitable plungers 158 at diametrically opposite points of said nozzle provided, if desired, with the central sockets 160 in the ends thereof, and the vertical cam holes 162 therein to be actuated simultaneously inwardly on the simultaneous downward depression of the vertically reciprocal cam means 164 to accomplish the above results at station 5. I have shown in station 6 means 155 mounted on said standard to function with said adjacent mandrel at said valve closing station 6 to oscillate said valve 32 to a closed position, in the specific embodiment comprising a horizontally reciprocal plunger 164 having a cam hole 166 therein adapted to be moved inwardly by the vertically reciprocal cam 164, the end 170 of said horizontally reciprocal plunger 164 being adapted to abut the outwardly projecting surface 76 of said turning lug 38 to move said turning lug and oscillate said closure member 32 from the open position shown in Figs. 25 and 26 to the closed position shown in Figs. 27 and 28 to bring the ends of the discharge passage 34 of said valve member 32 in a closed position opposite the side wall 58 of said nozzle. I have shown at the second crimping station 7 in detail in Fig. 28 crimping means mounted on said standard to function with said adjacent mandrel to perfect said first crimping and seal said closure means into a shipping position comprising a vertically reciprocal punch or press member 148 having the annular crimping portion 152 thereon substantially identical in structure to shown in Fig. 25 for the first crimping station 4.

In place of the first crimping station 4, flattening pivot forming station 5, valve closing station 6 and final crimping station 7, I may perform the entire operation done at said stations at one station by providing means mounted on said standard to function with said adjacent mandrel at a single crimping and pivot forming station to simultaneously crimp the upper portion of said nozzle side wall 52 over the upper surface of said valve member and diametrically press the nozzle side walls inwardly at diametric points thereof as at 59 to form a pivotal axis of rotation for said valve member. I have shown in Fig. 29 a suitable type of means for this purpose which comprises a vertically reciprocal punch sleeve 172 having slidably mounted therein, a supplemental punch shaft 174 having the upper ends 176 of pressing cams 178 pivotally mounted thereon as at 180 at diametrically opposite points thereof and having the pivot forming sockets 182 on the inner surfaces of the lower ends thereof. At diametric points thereof, said slidable punch shaft 174 is provided with suitable recesses 184 to receive the springs 186 therein to tend to pivot the cam members 178 outwardly at all times. With this construction it is obvious that the pivot shaft 174 may be lowered so that the annular crimping edge 152 thereof may abut the upper portion 52 of said hollow nozzle side wall to crimp it over the upper surface of said valve member as the upper valve seat portion 46, and after said crimping surface 152 has started to function the outer punch sleeve 172 may be slid downwardly over said punch shaft 174 compressing the cam members 178 inwardly to cause the pivot forming sockets 182 thereof to press the nozzle side wall inwardly at diametric points thereof to form the flattened sides 59 to provide a pivotal axis of rotation 36 for said valve member 32, the pivot lugs 60 sinking in the sockets 66 of said nozzle side wall portion for this purpose.

It is apparent however in this assembly apparatus that if desired, the washer loading station may be dispensed with and the valve closing station 6 and the second crimping station 7 may, if desired, be also dispensed with or that the four stations, namely numbers 4, 5, 6, and 7 may be combined into one station in a manner hitherto described. When performing the steps of crimping and inwardly pressing simultaneously, the turning lug 38 may be in upright position aligning the discharge passage 34 with the ends 22 and 40 of said nozzle, it being no longer necessary for a second crimping as the sleeve 172 may be withdrawn to free the outwardly impelled socket forming pivoted surfaces 182 from the diametrically opposite sides of said hollow nozzle wall prior to withdrawing the crimping shaft 174 from said upper valve seat forming portion 46. It is apparent however that the effect of giving the upper valve seat portion a final separate crimp to firmly keep the valve in closed position for shipping purposes is not possible where all steps are combined in one. It is thus obvious that I have provided a novel type of nozzle closure means for containers, bottles, tubes, cans and the like having various novel features therein specifically designed for ease of manufacture of both nozzle member and valve member thereof and ease of assembly thereof, a novel valve member for this purpose and a novel method of its manufacture, a novel type of extrusion apparatus to extrude the nozzle in a novel method and forming a novel intermediate nozzle product, and a novel process of assembly as well as an entire process of manufacture of said nozzle closure means and a novel apparatus for assembling the valve closure member within the valve seat of the nozzle portion thereof with the advantages carefully explained above.

It is understood that my invention is not limited to the specific embodiments of apparatus shown or methods described and that various deviations may be made therefrom without departing from the spirit and scope of the appended claims.

What I claim is:

1. The method of manufacturing a nozzle closure member for a container having an at least partially spherical valve closure member pivotally mounted in the nozzle thereof which comprises making a nozzle member provided with a partially spherical valve seat portion on the interior of the nozzle thereof by placing a metal blank on a die and extruding said blank to form a nozzle with a partially spherical lower valve seat portion on the inner surface of said nozzle and an upper nozzle wall portion projecting substantially vertically upwardly from said lower valve seat portion, assembling said valve member in said nozzle member by inserting said at least partially spherical valve closure member having a turning lug thereon and axis forming means located diametrically thereon within said lower valve seat portion with the turning lug in upright position and said diametric axis forming means in a substantially horizontal plane, crimping the upper portion of said nozzle member upper side wall downwardly over the upper surface of said valve member to form a hollow partially spherical upper valve seat portion having central dispensing hole means with said turning lug projecting upwardly therethrough, and gently pressing inwardly diametrically opposite portions only of said nozzle upper wall against said diametric axis forming means on said closure member to form bearing means diametrically of the inner wall of said valve seat in association with said axis forming means located diametrically of said closure member.

2. The method of manufacturing a nozzle closure member for a container, having an at least partially spherical closure member pivotally mounted in the nozzle thereof which comprises making a nozzle member provided with a partially spherical valve seat portion on the interior of the nozzle thereof by placing a metal blank on a die and extruding said blank to form a nozzle with a partially spherical lower valve seat portion on the inner surface of said nozzle and an upper nozzle wall portion projecting substantially vertically upwardly from said lower valve seat portion, assembling said valve member in said nozzle member by inserting said at least partially spherical valve closure member having a turning lug thereon and axis forming means located diametrically thereon within said lower valve seat portion with the turning lug in upright position and said diametric axis forming means in a substantially horizontal plane, simultaneously crimping the upper portion of said nozzle member upper side wall downwardly over the upper surface of said valve member to form a hollow partially spherical upper valve seat portion having central dispensing hole means with said turning lug projecting upwardly therethrough while gently pressing inwardly diametrically opposite portions only of said nozzle upper wall against said diametric axis forming means on said closure member to form bearing means diametrically of the inner wall of said valve seat in association with said axis forming means located diametrically of said closure member.

3. The method of manufacturing a nozzle closure member for a container having at least partially spherical valve closure member pivotally mounted in the nozzle thereof which comprises making a nozzle member provided with a partially spherical valve seat portion on the interior of the nozzle thereof by placing a metal blank on a die and extruding said blank to form a nozzle with a partially spherical lower valve seat portion on the inner surface of a thickened portion of said nozzle having an annular washer receiving recess thereon and a metal saving annular recess on the lower surface of said thickened portion and with a relatively thin upper nozzle wall portion projecting substantially vertically upwardly from said lower valve seat portion, and assembling said valve closure member in said nozzle member by inserting an annular washer within the countersunk washer receiving recess of said lower partially spherical valve seat portion, inserting said at least partially spherical valve closure member having a turning lug thereon and axis forming means located diametrically thereof within said lower valve seat portion over said washer with the turning lug in upright position and with said diametric axis forming means in a substantially horizontal plane therein, crimping the upper portion of said nozzle member upper side wall downwardly over the upper surface of said valve member to form a hollow partially spherical upper valve seat portion having central dispensing hole means with said turning lug projecting upwardly therethrough, gently pressing inwardly diametrically opposite portions of said relatively thin nozzle upper wall only against said diametrically opposite axis of oscillation forming valve portions to form bearing means diametrically of the inner wall of said valve seat in association with said axis forming means located diametrically of said closure member, oscillating said valve turning lug to move said valve member to a position closing said nozzle, and again crimping the upper portion of said nozzle member side wall downwardly over the upper surface of said valve member to re-align said hollow upper valve seat portion and seal said valve in a shipping position.

4. The method of manufacturing a nozzle closure member for a container having an at least partially spherical valve closure member pivotally mounted in the nozzle thereof which comprises making a nozzle member provided with a partially spherical valve seat portion on the interior of the nozzle thereof by placing a metal blank on a die and extruding said blank to form a nozzle with a partially spherical lower valve seat portion on the inner surface of a thickened portion of said nozzle having an annular washer receiving recess thereon and a metal saving annular recess on the lower surface of said thickened portion and with a relatively thin upper nozzle wall portion projecting substantially vertically upwardly from said lower valve seat portion, and assembling said valve closure member in said nozzle member by inserting an annular washer within the countersunk washer receiving recess of said lower partially spherical valve seat portion, inserting said at least partially spherical valve closure member having a turning lug thereon and axis forming means located diametrically thereof within said lower valve seat portion over said washer with the turning lug in upright position and with said diametric axis forming means in a substantially horizontal plane therein, crimping the upper portion of said nozzle member upper side wall downwardly over the upper surface of said valve member to form a hollow partially spherical upper valve seat portion having central dispensing hole means with said turning lug projecting upwardly therethrough, gently pressing inwardly diametrically opposite portions of said relatively thin nozzle upper wall only against said diametrically opposite axis of oscillation forming valve portions to form bearing means diametrically of the inner wall of said valve seat in association with said axis forming means located diametrically of said closure member.

5. The method of manufacturing a nozzle closure member for a container having an at least partially spherical closure member pivotally mounted in the nozzle thereof which comprises making a nozzle member provided with a partially spherical valve seat portion on the interior of the nozzle thereof by placing a metal blank on a die and extruding said blank to form a nozzle with a partially spherical lower valve seat portion on the inner surface of said nozzle and an upper nozzle wall portion projecting substantially vertically upwardly from said lower valve seat portion, assembling said valve member in said nozzle member by inserting said at least partially spherical valve closure member having a turning lug thereon and axis forming means located diametrically thereof within said lower valve seat portion with the turning lug in upright position and said diametric axis forming means in a substantially horizontal plane, crimping the upper portion of said nozzle member upper side wall downwardly over the upper surface of said valve member to form a hollow partially spherical upper valve seat portion having central dispensing hole means with said turning lug projecting upwardly therethrough, and gently pressing inwardly diametrically opposite portions only of said nozzle upper wall against said diametric axis forming means on said closure member to form bearing means diametrically of the inner wall of said valve seat in association with said axis forming means located diametrically of said closure member, oscillating said valve turning lug to move said valve member to a position closing said nozzle, and again crimping the upper portion of said nozzle member side wall downwardly over the upper surface of said valve member to re-align said hollow upper valve seat portion and seal said valve in a shipping position.

6. The method of manufacturing a nozzle closure member for a container having an at least partially spherical closure member pivotally mounted in the nozzle thereof which comprises making a nozzle member provided with a partially spherical valve seat portion on the interior of the nozzle thereof by placing a metal blank on a die and extruding said blank to form a nozzle with a partially spherical lower valve seat portion on the inner surface of said nozzle and an upper nozzle wall portion projecting substantially vertically upwardly from said lower valve seat portion, assembling said valve member in said nozzle member by inserting said at least partially spherical valve closure member having a turning lug thereon and axis forming means located diametrically thereof within said lower valve seat portion with the turning lug in upright position and said diametric axis forming means in a substantially horizontal plane, crimping the upper portion of said nozzle member upper side wall downwardly over the upper surface of said valve member to form a hollow partially spherical upper valve seat portion having central dispensing hole means with said turning lug projecting upwardly therethrough, and gently pressing inwardly diametrically opposite portions only of said nozzle upper wall against said diametric axis forming means on said closure member to form bearing means diametrically of the inner wall of said valve seat in association with said axis forming means located diametrically of said closure member, and oscillating said valve turning lug to move said valve member to a position closing said nozzle.

7. The method of manufacturing closure means for a container, which comprises pressure shaping a blank of ductile material to form a nozzle and around an at least partially spherical nozzle closure member having a turning lug thereon and axis forming means located diametrically thereof; the method comprising at least two stages in the first stage of which the ductile metal blank is pressure-shaped to form the nozzle and the inner wall thereof shaped to approximately the shape of the valve seat for the closure member and thereafter the closure member is disposed in position on said valve seat with the turning lug extending through the outer end of the nozzle and the ductile metal is further pressure-shaped to form a partially spherical valve seat on the inner wall of said nozzle extending around, and partially over said closure member, with said turning lug projecting outwardly through the outer end of said nozzle; and diametrically opposite portions of said nozzle wall only are gently pressed inwardly against said diametrically opposite axis of oscillation forming valve portions to form bearing and retaining means diametrically of the inner wall of said valve seat in association with said axis forming means located diametrically of said closure member.

8. The method of manufacturing closure means for a container, which comprises pressure shaping a blank of ductile material to form a nozzle and around an at least partially spherical nozzle closure member having a turning lug thereon and axis forming means located diametrically thereof; the method comprising at least two stages in the first stage of which the ductile metal blank is pressure shaped to form the nozzle, and thereafter diametrically opposite portions of said nozzle wall only are gently pressed inwardly adjacent said diametrically opposite axis of oscillation forming valve portions to form bearing and retaining means diametrically of the inner wall of said nozzle in association with said axis forming means located diametrically of said closure member, and the closure member is disposed in position in said nozzle with the turning lug extending through the outer end of the nozzle and the ductile metal is further pressure-shaped to form a partially spherical valve seat on the inner wall of said nozzle extending around, and partially over said closure member, with said turning lug projecting outwardly through the outer end of said nozzle.

9. The method of manufacturing closure means for a container, which comprises pressure shaping a blank of ductile material to form a nozzle and around an at least partially spherical nozzle closure member having a turning lug thereon and axis forming means located diametrically thereon; to form a partially spherical valve seat on the inner wall of said nozzle extending around, and partially over said closure member, with said turning lug projecting outwardly through the outer end of said nozzle; and diametrically opposite portions of said nozzle wall only are gently pressed inwardly adjacent said diametrically opposite axis of oscillation forming valve portions to form bearing means diametrically of the inner wall of said valve seat in association with said axis forming means located diametrically of said closure member.

10. The method of manufacturing closure means for a container, which comprises pressure shaping a blank of ductile material to form a nozzle and around an at least partially spherical nozzle closure member having a turning lug thereon and axis forming means located diametrically thereof; the method comprising at least two stages in the first stage of which the ductile metal blank is pressure shaped to form the nozzle and provided with a washer receiving recess on the inner surface of the wall thereof, and thereafter diametrically opposite portions of said nozzle wall only are gently pressed inwardly adjacent said diametrically opposite axis of oscillation forming valve portions to form bearing and retaining means diametrically of the inner wall of said nozzle in association with said axis forming means located diametrically of said closure member, and the washer is inserted in said recess and the closure member is disposed in position in said nozzle with the turning lug extending through the outer end of the nozzle and the ductile metal is further pressure-shaped to form a partially spherical valve seat on the inner wall of said nozzle extending around, and partially over said closure member, with said turning lug projecting outwardly through the outer end of said nozzle.

KENNETH CROWELL BAXTER,
*Administrator of the Estate of Albert H. Church, Deceased.*